(12) United States Patent
Chen

(10) Patent No.: US 11,686,809 B1
(45) Date of Patent: Jun. 27, 2023

(54) ACOUSTIC POSITIONING SYSTEM AND METHOD FOR SMARTPHONE AND WEARABLE DEVICE, AND TERMINAL

(71) Applicant: Zhejiang Deqing Zhilu Navigation Technology Co., LTD, Huzhou (CN)

(72) Inventor: Ruizhi Chen, Huzhou (CN)

(73) Assignee: Zhejiang Deqing Zhilu Navigation Technology Co., LTD, Huzhou (CN)

( * ) Notice: Subject to any disclaimer, the term of this patent is extended or adjusted under 35 U.S.C. 154(b) by 0 days.

(21) Appl. No.: 17/969,653

(22) Filed: Oct. 19, 2022

Related U.S. Application Data

(63) Continuation of application No. PCT/CN2022/093481, filed on May 18, 2022.

(30) Foreign Application Priority Data

May 5, 2022 (CN) .......................... 202210482590.0

(51) Int. Cl.
*G01S 5/22* (2006.01)
(52) U.S. Cl.
CPC ..................................... *G01S 5/22* (2013.01)
(58) Field of Classification Search
CPC ........................................................ G01S 5/22
USPC ........................................................ 702/152
See application file for complete search history.

(56) References Cited

U.S. PATENT DOCUMENTS

2016/0097788 A1   4/2016 Looze et al.
2019/0025402 A1*  1/2019 Qu .......................... G01S 11/14
2021/0156986 A1   5/2021 Shee et al.

FOREIGN PATENT DOCUMENTS

CN    110568408 A    12/2019
CN    111174781 A    5/2020
CN    112924935 A    6/2021

OTHER PUBLICATIONS

Title of the Item: Acta Geodaetica et Cartographica Sinica Publication Date: Feb. 15, 2021 Name of the Author: Ruizhi Chen et al. Article Title: Tightly-coupled integration of acoustic signal and MEMS sensors on smartphones for indoor positioning pp. 143-152.
Title of the Item: IEEE Transactions on Instrumentation and Measurement Publication Date: May 21, 2021 Name of the Author: Ruizhi Chen et al. Article Title: Precise Indoor Positioning Based on Acoustic Ranging in Smartphone vol. 70.

* cited by examiner

*Primary Examiner* — Aditya S Bhat
(74) *Attorney, Agent, or Firm* — Nitin Kaushik

(57) ABSTRACT

The present disclosure belongs to the technical field of acoustic positioning, and discloses an acoustic positioning system and method for a smartphone and a wearable device, and a terminal. A ranging signal is transmitted by virtue of a base station network, and specific space signals of which the frequencies are 12 kHz to 21 kHz are designed; the ranging signal is received and decoded by virtue of a user terminal, distances from base stations to the user terminal are estimated according to the first arrival signals, and the position of a user is estimated according to a plurality of distances measured on the position of the user. The present disclosure provides the acoustic positioning system (APS) for the smartphone and the wearable device, which is a technology for precise ranging based on acoustic waves.

6 Claims, 9 Drawing Sheets

ACOUSTIC POSITIONING SYSTEM AND METHOD FOR SMARTPHONE AND WEARABLE DEVICE, AND TERMINAL

CROSS-REFERENCE TO RELATED APPLICATIONS

The application claims priority to Chinese patent application No. 2022104825900, filed on May 6, 2021, the entire contents of which are incorporated herein by reference.

TECHNICAL FIELD

The present disclosure belongs to the technical field of acoustic positioning, and in particular relates to an acoustic positioning system and method for a smartphone and a wearable device, and a terminal.

BACKGROUND

At present, a global navigation satellite system (GNSS) has been an important outdoor positioning technology all the time. However, weak GNSS signals are incapable of penetrating through an indoor space. Precise positioning for personnel, objects, and vehicles in an indoor environment is still a challenging task. In recent years, due to great demands on positioning for indoor personnel, objects, robots, and vehicles in applications such as indoor navigation, position service, and artificial intelligence, the interest in developing a precise indoor positioning technology has been increasingly strong. Various positioning technologies such as ultra wide band, Wi-Fi RTT, Bluetooth AoA, acoustic ranging, and 5G technologies have shown the potential of indoor precise positioning.

By using a GNSS technology, a great number of applications such as automobile navigation, automatic drive, package tracking, land surveying, landslide monitoring and navigational positioning of an unmanned aerial vehicle (UAV) have been achieved. However, most of these applications are used in outdoor environments where GNSS signals can be received. Shown by a national human activity pattern survey (NHAPS) report, it takes people 86.9% of time to stay in closed buildings. About 80% of data communication, 70% of calling, 80% of mobile payment and 80% of position relevant information occur indoors. In closed indoor environments such as airports, railway stations, exhibition halls, and large factories, there are more and more interests and demands on positioning personnel, robots, devices, trailers, shipping carts and many other objects to provide an intelligent management function. In addition, for future applications such as a smart city, digital twin, and an upcoming metaverse application, it is necessary to acquire real-time geographic spatial data relevant to positions of indoor personnel, objects and vehicles and project the real-time information into a virtual space to achieve system intelligence. Now, an indoor precise positioning technology plays a vital role in the aspect of providing geographic spatial big data to support the application of artificial intelligence (AI).

However, due to the unavailability of the GNSS signals, the complexity of indoor topology, the challenging for a signal propagation environment and arbitrary varied postures, such as sending short messages, swinging, making a call and putting the smartphone into a pocket, of people holding a smartphone with a hand, precise positioning of the personnel, objects and the vehicles in indoor environments is still a challenging task. Wi-Fi and Bluetooth are most common indoor positioning radio frequency signals, which is due to the fact that these signals are available in the smartphone. In recent years, various technologies include:

(1) Wi-Fi Fine Timing Measurement (FTM) by which high positioning precision is achieved by using a round-trip time (RTT) ranging solution, wherein the technology is embedded in a Google smartphone, capable of reaching about 1 m ranging precision and providing 1-2 m positioning precision; however, due to the interaction characteristic of the RTT solution, it can only support a limited number of users at the same time;

(2) an ultra wide band (UWB) ranging technology which is initially applied to the smartphone industry by Apple, wherein at present, for other companies such as MIUI and Samsung, a UWB chip has also been achieved in a smartphone; although the smartphone supporting the UWB at present may provide a directional and short-distance detection function, the development of comprehensive positioning ability of the smartphone is still to be improved in the next few years;

(3) Bluetooth 5.1 which provides the ability of measuring a signal angle of arrival (AoA) by an antenna array, wherein the AoA is estimated according to measured values of the phase and amplitude of a signal collected at each antenna; it is a solution which is low in cost and low in energy; according to mounting heights of signal transmitters, 1-3 m positioning precision can be achieved; however, it is limited by the antenna army, complicated error compensation is required in advance;

(4) 5G which is another greatly potential indoor positioning technology, wherein 5G has three characteristics beneficial to positioning: base stations are mounted intensively (the indoor space is 30-50 m), the band width is large, and the antenna array is adaptive; and 5G may provide the ranging precision higher than t m and 2-3 in positioning precision; and (5) simultaneous localization and mapping (SLAM) which has been favorably applied to robots, automatic drive and UAVs, wherein it is an expensive solution and requires massive calculation so as not to be adopted in a smartphone platform.

Found by above analysis, there are the problems and defects in the prior art:

(1) due to the interaction characteristic of the RTT solution, the limited number of users are only supported at the same time. The Bluetooth 5.1 is limited by the antenna array, the complicated error compensation is required in advance. The existing simultaneous localization and mapping method is high in cost, and requires massive calculation so as not to be adopted in the smartphone platform; and (2) the indoor positioning technology is analyzed as follows:

(2.1) a Wi-Fi technology can achieve positioning, monitoring and tracking tasks in a complicated environment by a wireless local area network (WLAN) consisting of wireless access points (including wireless routers). A mobile device which has been accessed is positioned at a greater height between about 1 m and 20 m in an experience test and signal propagation model combination manner on the basis and premise of positional information of network nodes (the wireless access points). If positioning measurement is only based on a currently connected Wi-Fi access point, rather than referring to a signal intensity composition graph of surrounding Wi-Fi, it is easy to generate an error (such as a floor positioning error) in Wi-Fi positioning. In addition, generally, the Wi-Fi access point can only cover an area with the radius being about 90 m, and is easily disturbed by other signals, and thus, the precision is affected, and the energy consumption of a positioner is also higher;

(2.2) a Bluetooth technology for Bluetooth communication is a wireless transmission technology which is short in distance and low in energy, after an appropriate Bluetooth local area network access point is installed indoors, the network is configured in a multi-user-based basic network connection mode, and it is ensured that the Bluetooth local area network access point is always a main device of this micronetwork. In this way, position information of a user may be achieved by detecting signal intensity. An indoor Bluetooth positioning technology has the greater advantages of small device volume, short distance and low energy; (2.3) an infrared technology for indoor positioning is used for positioning by receiving infrared rays transmitted and modulated by each mobile device (an infrared IR identifier) via an optical sensor mounted indoors and has relatively high indoor positioning precision. However, the rays are incapable of penetrating through an obstacle, so that infrared rays can only be propagated within the line of sight and are easily disturbed by other lamplight, and the transmission distance of the infrared rays is shorter, so that the indoor positioning effect is poorer. When being put into a pocket or shielded by a wall, the mobile device is incapable of normally working, receiving antennae are required to be mounted in each room and corridor, and thus, the overall cost is higher;

(2.4) greatly differing from a positioning method in a traditional communication technology, an ultra wide band technology has no requirements on the use of carrier waves in a traditional communication system, is used for transmitting data by transmitting and receiving extremely narrow impulse which is nanosecond-level or lower-level, and may be used for indoor positioning, such as finding positions of soldiers on a battleground, tracking the motion of robots and the like. Compared with a traditional narrow band system, the ultra wide band system has the advantages such as high penetrability, low energy, good anti-multipath effect, high safety, low systematic complexity, capability of improving the positioning precision and the like, and is usually used for positioning, tracking or navigating indoor moving objects;

(2.5) an RFID positioning technology is used for performing non-contact two-way communication for data exchange in a radio frequency manner to achieve the purposes of recognizing and positioning the mobile device. By the technology, information of centimeter-level positioning precision may be obtained within several milliseconds, moreover, the transmission range is wide, and the cost is lower; however, the application range of the RFTD positioning technology is limited due to the following problems: 1) RFID is inconveniently integrated to the mobile device; 2) the action distance is short (generally dozens of meters as the greater length); 3) the safety privacy of a user is not protected; and 4) international standardization is not reached;

(2.6) an ultrasonic technology for ultrasonic positioning is mainly used for determining the position of an object by adopting reflective ranging (after an ultrasonic wave is transmitted and an echo generated by a measured object id received, the distance between the echo and the transmitted wave is calculated according to a time difference of the echo and the transmitted wave) and using an algorithm such as trigonometry positioning. Ultrasonic positioning is higher in overall positioning precision and simple in system structure, but is easily affected by a multipath effect and non-line-of-sight propagation, thereby reducing the positioning precision; and meanwhile, the technology also needs a great deal of base hardware facility investment so as to be higher in overall cost; and (2.7) a ZigBee technology is a wireless network technology which is short in distance and low in rate. ZigBee is between RFID and Bluetooth and may achieve positioning of a device by inter-coordination communication among sensors. At present, a 2.5G frequency, which is weak in diffraction capacity and wall penetrating capacity, in an ISM frequency band has been mainly adopted in the domestic ZigBee technology.

SUMMARY

For the problems existing in the prior art, the present disclosure provides an acoustic positioning system and method for a smartphone and a wearable device, a medium, a device, and a terminal.

The present disclosure is achieved in such a way: provided is an acoustic positioning method for a smartphone and a wearable device, wherein the acoustic positioning method for the smartphone and the wearable device includes:

transmitting a ranging signal by virtue of a base station network, and designing specific space signals of which the frequencies are 12 kHz to 21 kHz; and receiving and decoding the ranging signal by virtue of a user terminal, estimating distances from base stations to the user terminal according to first arrival signals, and estimating the position of a user according to a plurality of distances measured on the position of the user.

Further, the acoustic positioning method for the smartphone and the wearable device comprises the following steps:

step 1, designing Chirp signals of which the frequencies are 12 kHz to 21 kHz;

step 2, performing precise ranging based on acoustic waves; and step 3, performing positioning based on acoustic ranging and an inertial sensor.

Further, the Chirp signals designed in the step 1 are expressed as:

$$s(t) = A(t)e^{j2\pi\left(f_0 t + \frac{f_e - f_0}{2T}t^2\right)}, t \in [0, T]$$

wherein A(t) is an amplitude of an acoustic wave, T is a period of each Chirp signal, and $f_0$ and $f_e$ are respectively an initial frequency and a cutoff frequency; and by analyzing an indoor fading channel, a received signal is expressed as:

$$x(t) = s(t) * h(t) = \sum_{i=0}^{L-1} \alpha_i s(t - \tau_i) + N_i(t)$$

wherein $\alpha_i$, $\tau j$ and (t) are respectively a channel fading coefficient, propagation delay and random noise of an $i^{th}$ propagation path, h(t) is a channel impulse response in an indoor environment, $\tau_i$ is the delay of an $i^{th}$ component, and to is the delay of a first line-of-sight component.

Further, performing precise ranging based on acoustic waves in the step 2 comprises:

adopting a 50 ms Chirp period for the Chirp signals;

generating the given ranging signal s(t) in the smartphone, and performing Fourier transformation on a corresponding signal x(t) received by a microphone to obtain frequency domain descriptions of signals S(f) and X(f; and deducing a generalized cross spectrum G(f as:

$$G(f)=E[S(f)X(f)^H]$$

wherein E[*] is a mathematical expectation operator, f is a signal frequency, and H is hermitian transformation;

adopting a phase transformation and weighting solution to obtain unit gains of all frequency components, and retaining actual delay information;

$$\hat{G}(f)=G(f)/|G(f)|$$

performing inverse Fourier transformation to obtain the following relevant function R(τ):

$$R(\tau)=F^{-1}(\hat{G}(f))$$

wherein τ is the delay of the relevant function, and the delay Δt of the ranging signal s(t) is obtained by the following formula:

$$\Delta t = \underset{\tau}{\text{argmin}}\{|R(\tau)| \geq \beta \cdot \max[|R(\tau)|]\}$$

wherein β is a threshold factor, and β·max [|R(τ)|] represents an estimated threshold;

after the delay Δt is obtained, calculating a distance d from the user terminal to a corresponding base station sending the signal;

$$d=\Delta t \cdot c$$

wherein c is a sound velocity which is 343 m/s; and after a distance among at least three base stations, estimating the position of the user terminal by applying a least square trilateration algorithm or synthesis filtering algorithm.

Further, performing positioning based on acoustic ranging and an inertial sensor in the step 3 comprises:

estimating the position of the user terminal by integrating an acoustic range and a measured value of the inertial sensor, wherein a data driving part and a model driving part are comprised in data processing for estimating the position of the user, the data driving part estimates a velocity vector of the user based on a deep learning method, and the model driving part integrates the velocity vector and ranging measurement to estimate the position, heading and velocity of the user by using an extended Kalman filter;

(1) the data driving part estimates the velocity vector $v=[v_x, v_y, v_z]^T$ according to measured values of an accelerometer and a gyroscope sensor on the smartphone or a label, which is a data driving method based on the deep learning method;

(2) the model driving part integrates the velocity vector and precise ranging based on acoustic waves to estimate the position, heading and velocity of the user by using the extended Kalman filter.

Further, performing positioning based on acoustic ranging and an inertial sensor in the step 3 further comprises:

by applying a sliding window program to the measurement of an IMU of which the step length is 10 Hz, obtaining the output rate, which is 20 Hz, of a learned velocity vector, wherein a displacement vector is estimated by multiplying a time interval of two continuous periods $t_1$ and $t_2$ by the velocity vector and is expressed as follows:

$$\begin{bmatrix}\Delta x \\ \Delta y \\ \Delta z\end{bmatrix} = \begin{bmatrix}v_x \\ v_y \\ v_z\end{bmatrix}(t_2 - t_1)$$

collecting measured values of a distance and an azimuth from absolute coordinates, and estimating the position of the user by using a 21) method;

fusing the displacement vector obtained from a PDR network by adopting the extended Kalman filter, wherein the displacement vector is located in local coordinates L(x, y, u) defined by an initial heading x and a vertical direction u, and the y axis is defined under the action of right-handed Cartesian coordinates; as final coordinates output by the EKF are in navigation coordinates G(e, n, u) defined in an east, north, up direction, forming, by the two coordinates G and L, a rotation angle θ on a horizontal plane; introducing the rotation angle θ to a state vector of the filter as follows:

$$X_k=[e_k n_k \theta_k]^T$$

wherein [$e_k$, $n_k$] are respectively horizontal coordinates in east and north directions within an epoch k: $\theta_k$ comprises a rotation angle between the coordinates G and L and an accumulated drift error of the gyroscope; a state transition equation of a system is described as follows:

$$\tilde{X}_k = f(X_{k-1}) + W_k \quad \quad 1.$$

$$= \begin{bmatrix} e_{k-1} + \Delta x_k \cos(\theta_{k-1}) + \Delta y_k \sin(\theta_{k-1}) \\ n_{k-1} - \Delta x_k \sin(\theta_{k-1}) + \Delta y_k \cos(\theta_{k-1}) \\ \theta_{k-1} \end{bmatrix} + W_k \quad 2.$$

wherein $\tilde{X}_k$ is a predicted state vector; $W_k$ is process noise subject to normal distribution N(0, $Q_k$), and $Q_k$ is a covariance matrix of the process noise; and $\Delta x_k$ and $\Delta y_k$ are displacement components in the local coordinates L from a period k-1 to a period k obtained by a data-driven PDR network;

synchronizing clocks among all the signal transmitters by using a 433 MHz radio frequency, and achieving a synchronization error which is smaller than 0.1 ms; if the ranging signal is received from the plurality of signal transmitters, using a plurality of TDoA observation data, wherein an observation equation $Z_k$ is expressed as:

$$Z_k = h(X_k) + V_k = \begin{bmatrix} (\|X_k - S_2\| - \|X_k - S_1\|)/c \\ \vdots \\ (\|X_k - S_i\| - \|X_k - S_{i-1}\|)/c \\ \vdots \\ (\|X_k - S_m\| - \|X_k - S_{m-1}\|)/c \end{bmatrix} + V_k, i = (2, \ldots, m)$$

$$\tilde{Z}_k = h(\tilde{X}_k) = \begin{bmatrix} (\|\tilde{X}_k - S_2\| - \|\tilde{X}_k - S_1\|)/c \\ \vdots \\ (\|\tilde{X}_k - S_i\| - \|\tilde{X}_k - S_{i-1}\|)/c \\ \vdots \\ (\|\tilde{X}_k - S_m\| - \|\tilde{X}_k - S_{m-1}\|)/c \end{bmatrix} c = 331.45\sqrt{1 + \frac{T}{273.15}}$$

wherein $\tilde{Z}_k$ is a vector of a predicted observed value calculated by using the predicted state vector $\tilde{X}_k$, $S_i$ is a coordinate vector of an $i^{th}$ transmitter in the coordinates G, $V_k$ is an error vector of $Z_k$, and $Z_k$ is subject to normal distribution N(0, $R_k$), wherein $R_k$ is a covariance matrix of $Z_k$, m is the number of the transmitters available on the current position of the user, and c is a sound velocity at the temperature T;

updating the EKF as:

$$\tilde{P}_k = F_k P_{k-1} P_k^T + Q_k$$

$$K_k = \tilde{P}_k H_k^T (H_k \tilde{P}_k H_k^T + R_k))^{-1}$$

$$X_k = \tilde{X}_k + K_k (Z_k - \tilde{Z}_k)$$

$$P_k = (I - K_k H_k) \tilde{P}_k$$

wherein $F_k = \partial f / \partial X_k$, $H_k = \partial h / \partial X_k$, $X_k$ is state estimation, and $P_k$ is an updated covariance matrix.

Another objective of the present disclosure provides an acoustic positioning system for a smartphone and a wearable device, to which the acoustic positioning method for the smartphone and the wearable device is applied. The acoustic positioning system for the smartphone and the wearable device includes a base station network for transmitting a ranging signal, specifically designed space signals, and a user terminal used for receiving and decoding the ranging signal and estimating the position of a user:

wherein the base station network is a group of signal transmitters with each consisting of a loudspeaker, a clock synchronization module, a Bluetooth low energy module, and a micro-controller unit, and is used for broadcasting the specifically designed signals in the air, and base station clocks in the network are synchronized with a 433 MHz radio frequency:

he space signals are a group of linear frequency modulation signals of which the frequencies are 12 kHz to 21 kHz;

the user terminal is used for receiving and decoding the ranging signal, estimating distances from base stations to the user terminal according to first arrival signals, and estimating the position of the user according to a plurality of distances measured on the position of the user; and the user terminal executes a synthetic signal processing program and is used for positioning a smartphone of a person or a label of an object or vehicle and developing a dedicated chip for a label-based user terminal.

Further objective of the present disclosure provides a computer device, wherein the computer device includes a memory and a processor, the memory stores a computer program, and when the computer process is executed by the processor, the processor is enabled to perform the following steps:

transmitting a ranging signal by virtue of a base station network, and designing specific space signals of which the frequencies are 12 kHz to 21 kHz; and receiving and decoding the ranging signal by virtue of a user terminal, estimating distances from base stations to the user terminal according to first arrival signals, and estimating the position of a user according to a plurality of distances measured on the position of the user.

Yet further objective of the present disclosure provides a computer readable storage medium storing a computer program, wherein when the computer program is executed by a processor, the processor is enabled to perform the following steps:

transmitting a ranging signal by virtue of a base station network, and designing specific space signals of which the frequencies are 12 kHz to 21 kHz; and receiving and decoding the ranging signal by virtue of a user terminal, estimating distances from base stations to the user terminal according to first arrival signals, and estimating the position of a user according to a plurality of distances measured on the position of the user.

Further another objective of the present disclosure provides an information data processing terminal for achieving the acoustic positioning system for the smartphone and the wearable device.

in combination with the above-mentioned technical solutions and the solved technical problems, the advantages and positive effects of the technical solutions claimed to be protected by the present disclosure are analyzed from several aspects shown as follows.

Firstly, for the above-mentioned technical problems existing in the prior art and the difficulty in solving the problems, how to solve the technical problems in the technical solutions of the present disclosure is deeply analyzed in detail in tight combination with the technical solution claimed to be protected by the present disclosure as well as results, data and the like generated during research and development, and some creative technical effects brought after the problems are solved are specifically described as follows.

The present disclosure provides an acoustic positioning system (APS) for a smartphone and a wearable device which are based on acoustic waves. Different from most of technologies based on radio frequency (RF), the solution is based on acoustic waves. The acoustic positioning method provided by the present disclosure have the three advantages: high ranging precision, wide signal coverage range and capability of supporting all smartphone platforms under the condition that hardware of a smartphone is unchanged.

The present disclosure provides an acoustic positioning system consisting of three parts: a base station network for signal transmission, space signals for defining a ranging signal, and a user terminal used for receiving the ranging signal, calculating ranging measurement, and estimating the position of a user; the ranging signal adopts a frequency band 12 kHz to 21 kHz, and the ranging precision is 16 cm; a data-driven PDR grid is trained in a portioning algorithm by using a learned velocity vector of an inertial sensor, and further integration with acoustic ranging measurement is performed by using an extended Kalman filter; and the APS provides ±38 cm positioning precision in a static state and provides ±58 cm positioning precision in a dynamic state.

Secondly, with the technical solutions regarded as a whole or in view of a product, the technical effects and advantages of the technical solutions claimed to be protected in the present disclosure are specifically described as follows.

The present disclosure provides an acoustic positioning system (APS) for a smartphone and a wearable device, which is a technology for precise ranging based on acoustic waves. Proven by experimental results, the APS provided by the present disclosure can provide 16 cm ranging precision and 38 cm static positioning precision within a 50 m effective signal range.

Thirdly, as a creative supported evidence of claims of the present disclosure, the present disclosure is further embodied in several important aspects shown as follows:

(1) the technical solutions of the present disclosure fill up the blank of domestic and foreign technologies in the industry:

the present disclosure provides a technology for positioning based on acoustic waves, which fills up the blank of the domestic and foreign indoor positioning technology based on acoustic positioning;

(2) whether the technical solutions of the present disclosure solve technical problems always desired to be solved by people, but failed to be solved all the time:

according to the present disclosure, high-precision indoor positioning service is provided on the premise that the hardware of a phone is unchanged: and (3) whether the technical solutions of the present disclosure overcome technical prejudices:

the present disclosure provides an combined positioning technology based on acoustic ranging and RDR, by which model-driven acoustic precise ranging and data-driven PDR are tightly coupled, and a new paradigm and a new solution of a data and model double-driven navigational positioning theory are established; and a data-driven PDR network is trained in a portioning algorithm by using a learned velocity vector of an inertial sensor, and further integration with acoustic ranging measurement is performed by using an extended Kalman filter.

DETAILED DESCRIPTION OF THE EMBODIMENTS

For the problems existing in the prior art, the present disclosure provides an acoustic positioning system and method for a smartphone and a wearable device, and a terminal, and the present disclosure will be described in detail below with reference to the accompanying drawings.

First, explanation embodiments: in order to make the skilled in the art know about the specific implementation of the present disclosure sufficiently, this part shows the explanation embodiments for describing technical solutions of the claims.

Figure 1:
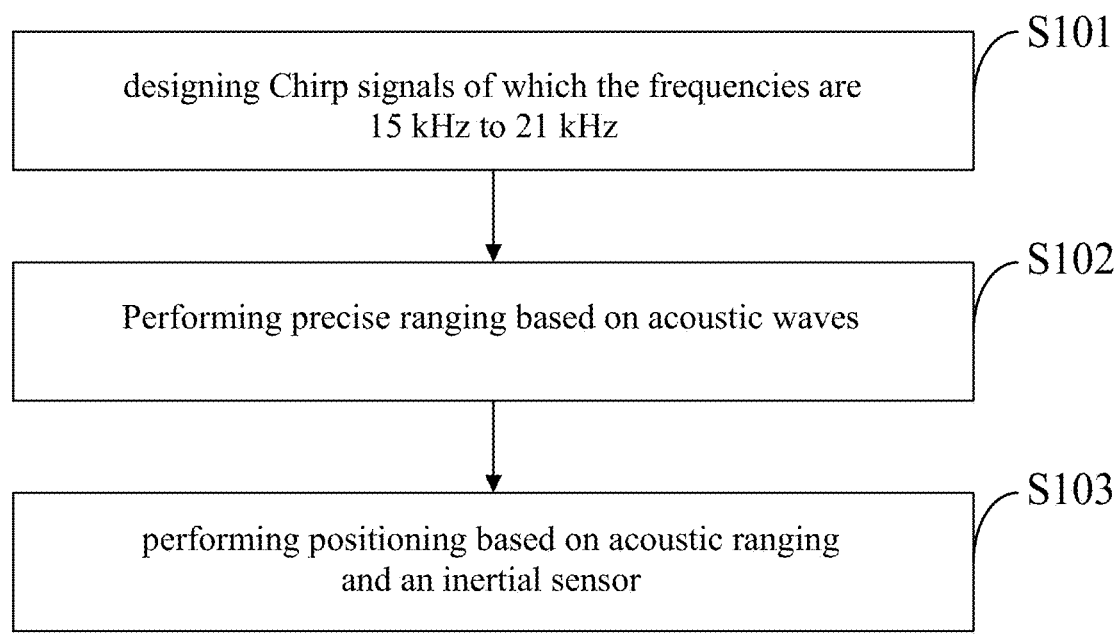
FIG. 1 is a process view of an acoustic positioning method for a smartphone and a wearable device provided in an embodiment of the present disclosure.

As shown in FIG. 1, an acoustic positioning method for a smartphone and a wearable device provided in an embodiment of the present disclosure includes the following steps:

S101, Chirp signals of which the frequencies are 12 kHz to 21 kHz are designed;

S102, precise ranging based on acoustic waves is performed; and

S103, positioning based on acoustic ranging and an inertial sensor is performed.

Figure 2:
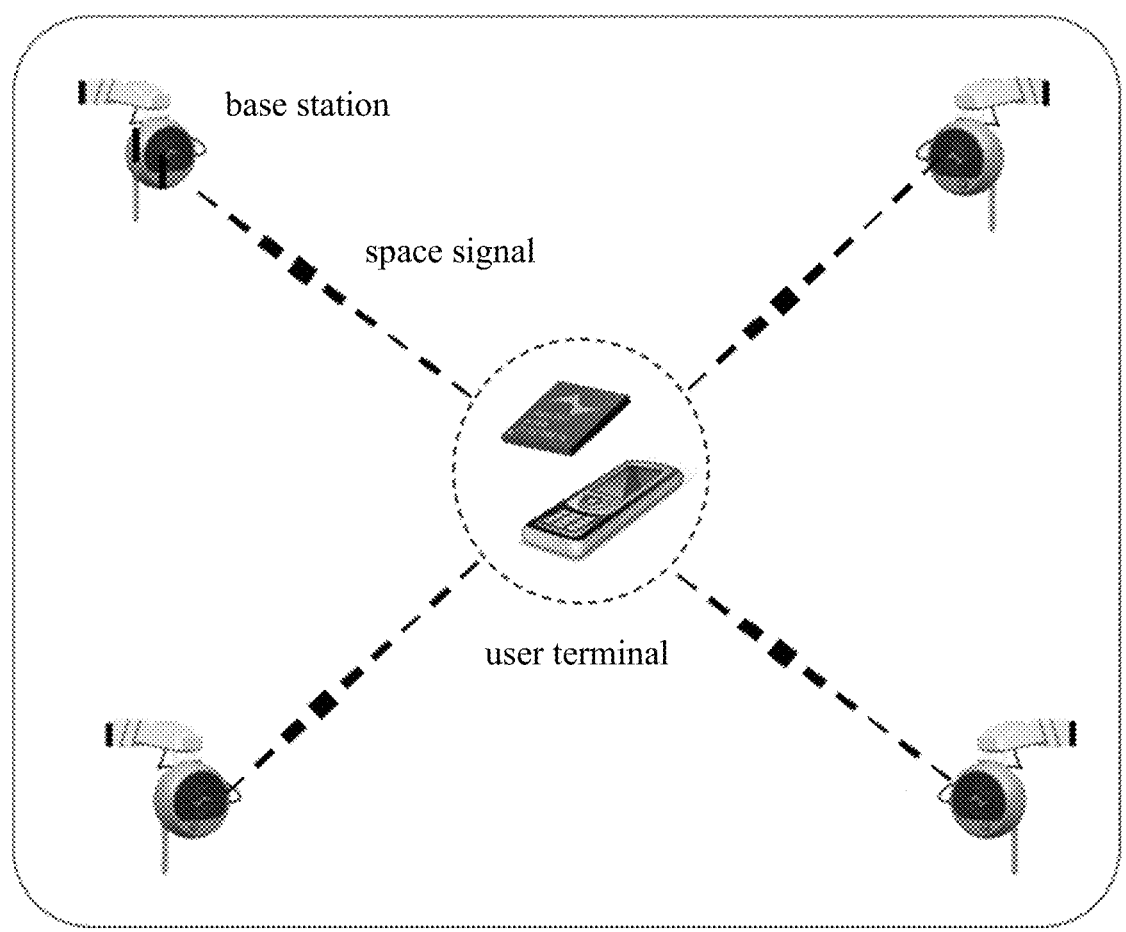
FIG. 2 is a schematic view of three constituent parts of an APS provided in an embodiment of the present disclosure.

As shown in FIG. 2, an acoustic positioning system for a smartphone and a wearable device provided in an embodiment of the present disclosure includes a base station network for transmitting a ranging signal, specifically designed space signals, and a user terminal used for receiving and decoding the ranging signal and estimating the position of a user.

The base station network is a group of signal transmitters with each consisting of a loudspeaker, a clock synchronization module, a Bluetooth low energy module, and a microcontroller unit, and is used for broadcasting the specifically designed signals in the air, and base station clocks in the network are synchronized with a 433 MHz radio frequency;

the space signals are a group of linear frequency modulation signals of which the frequencies are 12 kHz to 21 kHz;

the user terminal is used for receiving and decoding the ranging signal, estimating distances from base stations to the user terminal according to first arrival signals, and estimating the position of the user according to a plurality of distances measured on the position of the user; and the user terminal executes a synthetic signal processing program and is used for positioning a smartphone of a person or a label of an object or vehicle and developing a dedicated chip for a label-based user terminal.

The technical solution of the present disclosure will be further described below in combination with specific embodiments.

1. System Overview

An advanced architecture of the acoustic positioning system is shown as FIG. 2. The acoustic positioning system consists of three parts: a base station network for transmitting a ranging signal, specifically designed space signals, and a user terminal used for receiving and decoding the ranging signal and estimating the position of a user.

Figure 3:
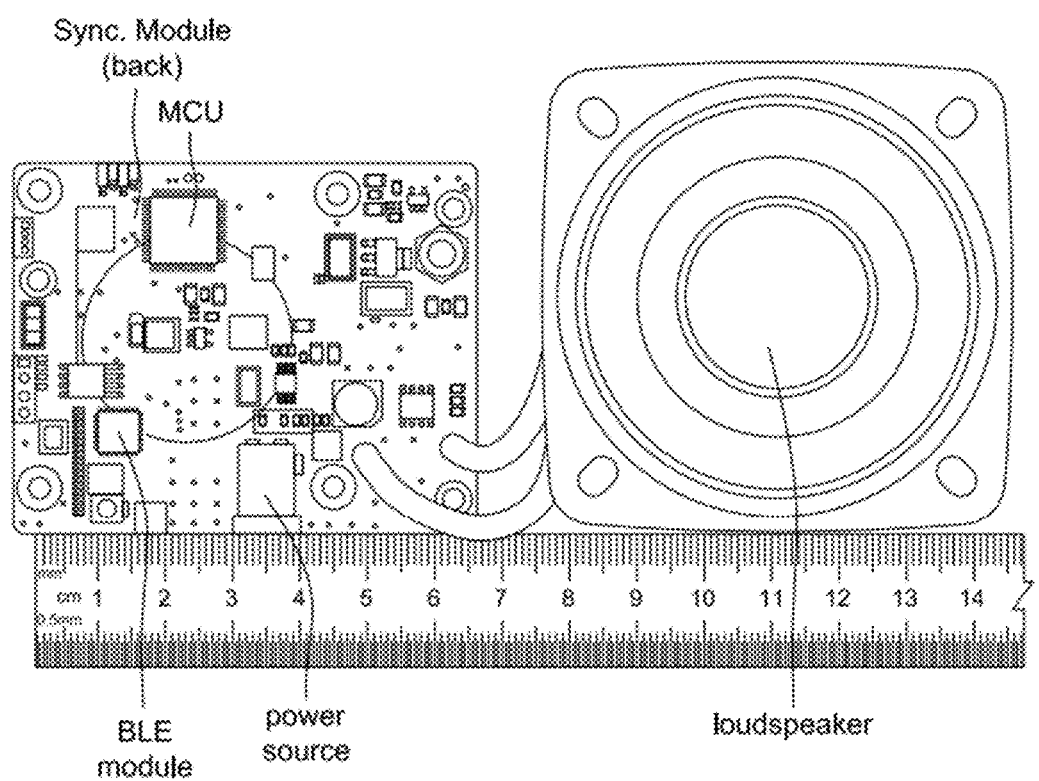
FIG. 3 is a schematic view of hardware layout of a base station provided in an embodiment of the present disclosure.

The base station network is a group of signal transmitters broadcasting the specifically designed signals in the air. Base station clocks in the network are synchronized with a 433 MHz radio frequency. A master clock is preserved by the whole network, all other clocks are synchronized with the master clock, with the precision being lower than 100 thousand seconds, which is high enough for the APS because a sound velocity is about 343 m/s. It means that a synchronization error is smaller than 3.4 cm. FIG. 3 shows hardware layout of a base station mainly consisting of a loudspeaker, a clock synchronization module, a Bluetooth low energy module, and a micro-controller unit.

The space signals are a group of linear frequency modulation (LFM) signals. The LFM signals are also called Chirp signals capable of better resisting to a Doppler effect. As the propagation velocity of acoustic waves is lower, it is an important issue existing in acoustic positioning. In order to reduce influences of environmental noise and generate no audible sound when the ranging signal is transmitted, the Chirp signals of which the frequencies are 12 kHz to 21 kHz are selected in the present disclosure. All smartphones support this frequency band, and therefore, the APS may be directly used for smartphones with Android or Apple systems without changing any hardware of the smartphones. Due to such a characteristic, this technology can be easily applied to the mass market.

The specifically designed Chirp signals may be expressed as:

$$s(t) = A(t)e^{j2\pi\left(f_0 t + \frac{f_e - f_0}{2T}t^2\right)}, t \in [0,T] \qquad (1)$$

wherein A(t) is an amplitude of an acoustic wave, T is a period of each Chirp signal, and $f_0$ and $f_e$ are respectively an initial frequency and a cutoff frequency. In view of an indoor fading channel, a received signal may be expressed as:

$$x(t)=s(t)*h(t)=\Sigma_{i=0}^{L-1}(t-\tau_1)+N_i(t)$$

wherein $\alpha_i$, $\tau_i$ and (t) are respectively a channel fading coefficient, propagation delay and random noise of an $i^{th}$ propagation path, h(t) is a channel impulse response (CIR) in an indoor environment, $T_1$ is the delay of an $i^{th}$ component, and $\tau_0$ is the delay of a first line-of-sight (LOS) component.

The user terminal has the functions of receiving and decoding the ranging signal, estimating distances from base stations to the user terminal according to first arrival signals, and estimating the position of a user according to a plurality of distances measured on the position of the user. The received signals may be disturbed by environmental noise, a wall reflected signal, a glass window and the like, and therefore, a synthetic signal processing program is executed in the user terminal to extract first arrival signals of distance signals. The user terminal may be used for positioning a smartphone of a person or labels of an object and a vehicle. A microphone built in the smartphone may be used for receiving an acoustic ranging signal, and therefore, it is unnecessary to change any hardware of a smartphone with an Android or iOS operation system. For a label-based user terminal, a dedicated chip has been developed.

2. Precise Ranging Based on Acoustic Waves

The Chirp signal expressed in the formula (1) may be generated by using a loudspeaker of a base station and broadcast in the air. The Chirp signal is an impulse signal having different feature codes. The period of the Chirp signal of the APS is about 50 ms which is shorter than an audio signal for oral communication of human beings. The Chirp signal is regularly broadcast by the base station and is received by the user terminal. The user terminal may be a smartphone or a label of an embedded chip and is used for specially processing the ranging signal transmitted by the base station.

The microphone built in the smartphone may generally record a frequency band 20 Hz to 23 kHz. In order to utilize the existing microphone in the smartphone, the ranging signal in the present disclosure is designed within this frequency band. The frequency of an audio signal of the sound of a person is generally lower than 15 kHz; in order to reduce disturbance of the signal, the ranging signal is adjusted to the frequency band 12 kHz to 21 kHz which is also applicable to the above-mentioned ranging signal, and therefore, it is unnecessary to change any hardware in the smartphone. The period of the Chirp signal is 50 ms.

Generalized cross correlation (GCC) is a typical delay estimation method, and delay may be converted into a geometrical distance from the user terminal to the base station. The given ranging signal s(t) defined in the formula (1) may be generated in the smartphone, and Fourier transformation is performed on a corresponding signal x(t) received by the microphone to obtain frequency domain descriptions of signals S(f) and X(f). A generalized cross spectrum G(f) may be deduced as:

$$G(f)=E[S(f)X(f)^H]$$

wherein E[*] is a mathematical expectation operator, f is a signal frequency, and H is hermitian transformation. In order to achieve a more steady solution, adopting a phase transformation (PHAT) and weighting solution to obtain unit gains of all frequency components, that is, actual delay information is retained.

$$\hat{G}(f)=G(f)/|G(f)|$$

Inverse Fourier transformation (IFT) is performed to obtain the following relevant function R(τ):

$$R(\tau)=F^{-1}(\hat{G}(f))$$

wherein τ is the delay of the relevant function, and the delay Δt of the ranging signal s(t) may be obtained by the following formula:

$$\Delta t = \underset{\tau}{\mathrm{argmin}}\{|R(\tau)| \geq \beta \cdot \max[|R(\tau)|]\}$$

wherein β is a threshold factor, and β·max[|R(τ)↑] represents an estimated threshold.

After the delay Δt is obtained, a distance d from the user terminal to a corresponding base station sending the signal may be easily calculated;

$$d=\Delta t \cdot c$$

wherein c is a sound velocity which is about 343 m/s. After a distance among at least three base stations is obtained, the position of the user terminal may be estimated by applying a least square trilateration algorithm or synthesis filtering algorithm, so that measured results of other sensors such as the inertial sensor built in the smartphone are prevented from being integrated.

3. Positioning Based on Acoustic Ranging and Inertial Sensor

Figure 5:
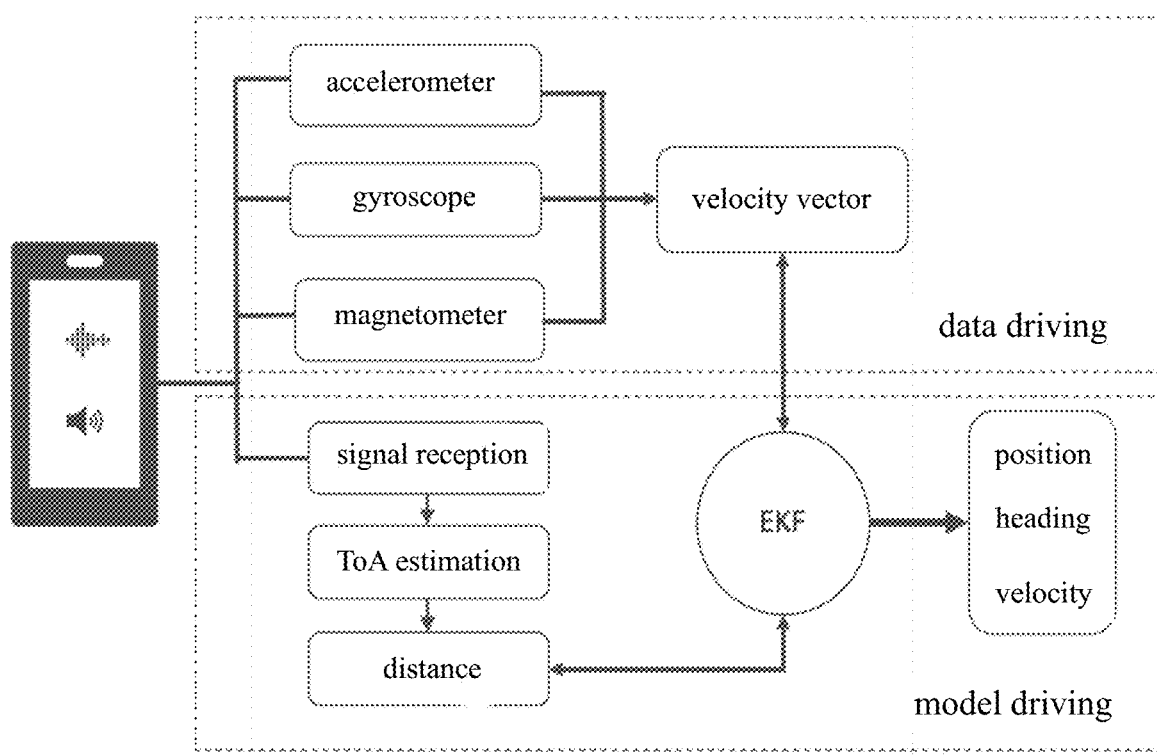
FIG. 5 is a schematic view of an integrated framework for estimating the position of a user provided in an embodiment of the present disclosure.

The position of the user terminal is estimated by integrating an acoustic range and a measured value of the inertial sensor, a data processing framework for estimating the position of the user mainly consists of two parts, as shown in FIG. 5, including a data driving part for estimating a velocity vector of the user based on a deep learning method and a model driving part integrating the velocity vector and ranging measurement to estimate the position, heading and velocity of the user by using an extended Kalman filter.

The data driving part estimates the velocity vector $v=[v_x, v_y, v_z]^T$ according to measured values of an accelerometer and a gyroscope sensor on the smartphone or the label, which is a data driving method based on the deep learning method;

The model driving part integrates the velocity vector and precise ranging based on acoustic waves to estimate the position, heading and velocity of the user by using the extended Kalman filter (EKF).

The inertial sensor plays a vital role in positioning the smartphone and the wearable device due to the advantages in the aspects of low energy and high data rate. However, there is a drift error in the measurement of a low-cost inertial sensor such as a accelerometer, a gyroscope, and a magnetometer, when dual integration is performed on an accelerated velocity to obtain a displacement, the error may be increased infinitely. A walking track of a pedestrian is estimated by adopting the deep learning method and utilizing the measurement of the inertial sensor as an input. It is a data driving method for pedestrian dead reckoning (PDR), which is completely different from the model driving method in which step-by-step detection is used.

Figure 6:
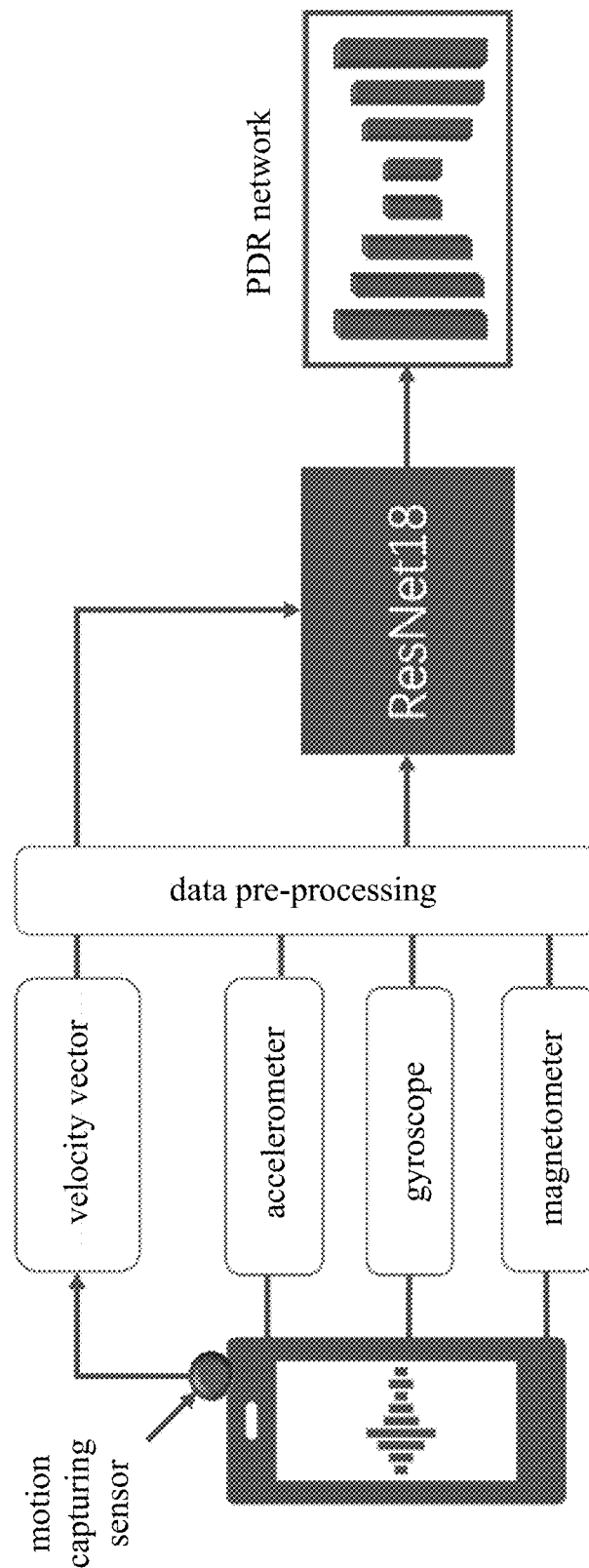
FIG. 6 is a schematic view of a training process of a data-driven PDR network provided in an embodiment of the present disclosure.

In the solution, used is a ResNet-18 network which is a convolutional neural network with 18-layer depth and a training network usually used for image recognition. A netversion for training more than 1000 thousands of images may be loaded from an ImageNet database. The framework is adopted to train a PDR network, as shown in FIG. 6, a motion capturing system is utilized to collect a training data set which may track a displacement vector of the smartphone at the precision of several millimeters. The motion capturing system is utilized to collect the training data set which may track a velocity vector at the precision of several millimeters. All data, including the velocity vector and a measured value of an IMU (Inertial Measurement Unit), collected in each period is transformed to initial local coordinates which are defined by arbitrary horizontal heading and a vertical line at the initial period of data collection. Coordinate transformation is completed in a data pre-processing step, as shown in FIG. 6, the learned velocity vector may be output at a high rate reaching up to 20 Hz. The displacement vector may be estimated by multiplying a time interval of two continuous periods by the velocity vector.

Figure 7:
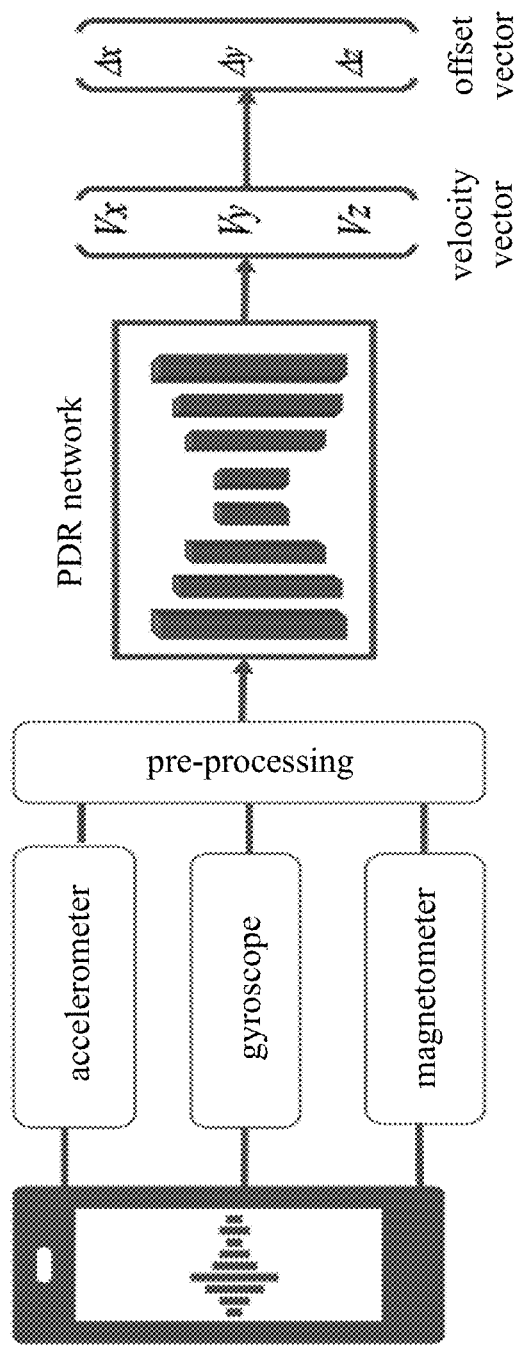
FIG. 7 is a schematic view of a process for estimating a velocity vector by using a trained PDR network provided in an embodiment of the present disclosure.

FIG. 7 shows a process for estimating a velocity vector by using a trained PDR network. The IMU sensor may output data at the rate 200 Hz, and therefore, by applying a sliding window program to the measurement of the IMU of which the step length is 10 Hz, the output rate of the learned velocity vector may be reached up to 20 Hz. The displacement vector is estimated by multiplying a time interval of two continuous periods $t_1$ and $t_2$ by the velocity vector and is expressed as follows:

$$\begin{bmatrix} \Delta x \\ \Delta y \\ \Delta z \end{bmatrix} = \begin{bmatrix} v_x \\ v_y \\ v_z \end{bmatrix} (t_2 - t_1)$$

The learned velocity vector is a relative vector. The geometrical shape of the walking track obtained by utilizing the velocity vector learned by virtue of the PDR network may be kept, but no any absolute horizontal directions are shown. Therefore, it is still necessary to collect some measured values such as distances and azimuths from absolute coordinates such as common east, north, up coordinates in automobile navigation.

For an outdoor environment, a GNSS technology is usually used for positioning the smartphone or the wearable device and is a very mature technology, and therefore, the APS is more applicable to the indoor environment. Although the APS is also applicable to the outdoor environment, the APS is not the solution having the highest cost benefit in the outdoor environment. Indoor positioning usually occurs on the plane of a horizontal floor, and therefore, the position of the user is estimated by adopting a 2D method as the algorithm in the present disclosure.

Figure 4:
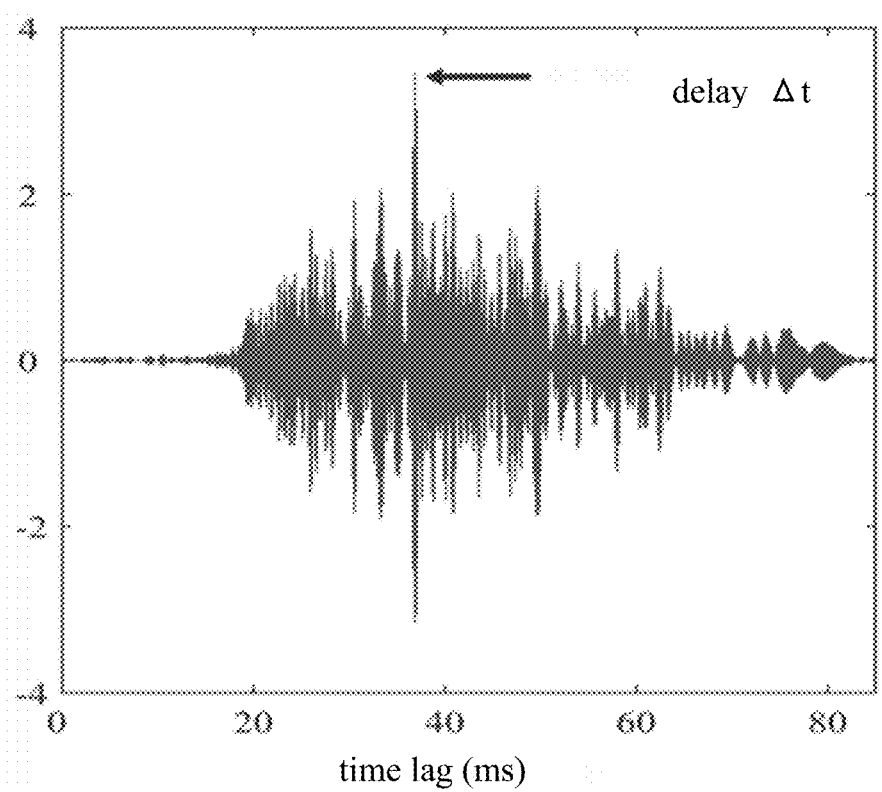
FIG. 4 is a schematic view of relevant functions of a ranging signal provided in an embodiment of the present disclosure.

As shown in FIG. 4, the displacement vector obtained from the PDR network is fused by adopting the extended Kalman filter (EKF). As mentioned above, the displacement vector is located in local coordinates L(x, y, u) defined by an initial heading x and a vertical direction u (up), and the y axis is defined under the action of right-handed Cartesian coordinates. As final coordinates output by the EKF are in navigation coordinates G(e, n, u) defined in an east, north, up direction, the two coordinates G and L form a rotation angle θ on a horizontal plane. Therefore, the rotation angle θ is introduced to a state vector of the filter as follows:

$$X_k = [e_k n_k \theta_k]^T$$

wherein $[e_k, n_k]$ are respectively horizontal coordinates in east and north directions within an epoch k. In fact, $\theta_k$ includes a rotation angle between the coordinates G and L and an accumulated drift error of the gyroscope. A state transition equation of a system is described as follows:

$$\tilde{X}_k = f(X_{k-1}) + W_k = \begin{bmatrix} e_{k-1} + \Delta x_k \cos(\theta_{k-1}) + \Delta y_k \sin(\theta_{k-1}) \\ n_{k-1} - \Delta x_k \sin(\theta_{k-1}) + \Delta y_k \cos(\theta_{k-1}) \\ \theta_{k-1} \end{bmatrix} + W_k$$

wherein $\tilde{X}_k$ is a coordinator for performing prediction by using the state transition equation; $W_k$ is process noise subject to normal distribution $N(0, Q_k)$, and $Q_k$ is a covariance matrix of the process noise. $\Delta x_k$ and $\Delta y_k$ are displacement components in the local coordinates L from a period k-1 to a period k obtained by a data-driven PDR network.

In the APS, clocks among all the signal transmitters are synchronized by using a 433 MHz radio frequency, and a synchronization error which is smaller than 0.1 ms is achieved, which is enough for the solution. However, it is impossible to synchronize the clock of the smartphone and the clocks of the signal transmitters. An observable known as a time difference of arrival (TDoA), which is used as a delay difference of two different transmitters at the same period, is utilized to eliminate the clock error of the smartphone. If the ranging signal may be received from the plurality of signal transmitters, a plurality of TDoA observation data may be used. An observation equation $Z_k$ may be expressed as:

$$Z_k = h(X_k) + V_k, = \begin{bmatrix} (\|X_k - S_2\| - \|X_k - S_1\|)/c \\ \vdots \\ (\|X_k - S_i\| - \|X_k - S_{i-1}\|)/c \\ \vdots \\ (\|X_k - S_m\| - \|X_k - S_{m-1}\|)/c \end{bmatrix} + V_k, i = (2, \ldots, m)$$

$$\tilde{Z}_k = h(\tilde{X}_k) = \begin{bmatrix} (\|\tilde{X}_k - S_2\| - \|\tilde{X}_k - S_1\|)/c \\ \vdots \\ (\|\tilde{X}_k - S_i\| - \|\tilde{X}_k - S_{i-1}\|)/c \\ \vdots \\ (\|\tilde{X}_k - S_m\| - \|\tilde{X}_k - S_{m-1}\|)/c \end{bmatrix}, c = 331.45\sqrt{1 + \frac{T}{273.15}}$$

wherein h(*) is an observed transition matrix, $\tilde{Z}_k$ is a vector of a predicted observed value calculated by using a predicted state vector $\tilde{X}_k$, St is a coordinate vector of an $i^{th}$ transmitter in the coordinates G, $V_k$ is an error vector of $Z_k$, and $Z_k$ is subject to normal distribution $N(0, R_k)$, wherein $R_k$ is a covariance matrix of $Z_k$, m is the number of the transmitters available on the current position of the user, and c is a sound velocity at the temperature T. The EKF may be updated as:

$$\tilde{P}_k = F_k P_{k-1} F_k^T + Q_k$$

$$K_k = \tilde{P}_k H_k^T (H_k \tilde{P}_k H_k^T + R_k)^{-1}$$

$$X_k = \tilde{X}_k + K_k (Z_k - \tilde{Z}_k)$$

$$P_k = (I - K_k H_k) \tilde{P}_k$$

wherein $F_k = \partial f / \partial X_k$, $H_k = \partial h / \partial X_k$, $X_k$ is state estimation, $\tilde{P}_k$ is a predicated covariance matrix, $P_k$ is an updated covariance matrix, $K_k$ is a Kalman gain, and I is a unit vector.

Second, application embodiments: in order to prove creativity and technical values of the technical solution of the present disclosure, this part shows the application embodiments for applying the technical solution in the claims to specific products or relevant technologies.

Application Example 1

Figure 9:
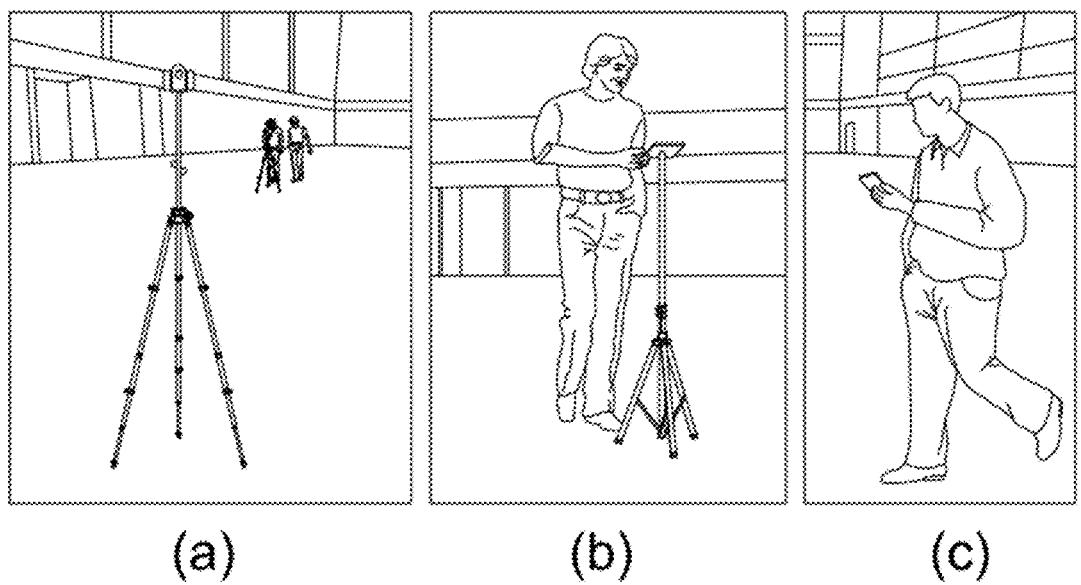
FIG. 9 is a schematic view of a test environment for a positioning error of the APS provided in an embodiment of the present disclosure.

An indoor visitor guiding system for exhibition hall 1 of a certain international exhibition center: the certain international exhibition center is located in a certain small town, wherein the overall hall of the exhibition hall 1 is in the size of 47.7*106.2*19 m and has the total occupied area greater than 5000 m². The scenario is oriented to meet the demand for positioning the visitors during actual exhibition, acoustic waves are taken as cores, and an analog-digital fused positioning solution is adopted in applications. A high-precision acoustic positioning source is covered in the venue, and thus, verification and index test on the technical solution of the present disclosure in an actual application scenario are completed. As shown in FIG. 9.

Application Example 2

A system for epidemic control assisted by positioning four dining halls for teachers and students in a university in a certain city: in order to embody the advanced effect of an analog-digital fused positioning technology on the monitoring level of epidemic control, the certain university is cooperated, and the system for epidemic control assisted by acoustic positioning is tried out in the four dining halls for the teachers and the students in the university. The system is a subsystem of a large health management system in the university and aims at meeting the demand that basic health information and flow information of personnel in the overall university are mastered in real time to efficiently trace various crowds for epidemic control so as to avoid large-scale viral infection under the condition that the normal teaching in the university gets back to normal. The acoustic system has clear functional demands in two aspects of personnel density monitoring and epidemic control source tracing.

1) Personnel Density Monitoring

Activity information of personnel in the university is acquired based on a real-time positioning signal, and the number and density of the personnel may be displayed in real time by data analysis and presentation (a thermodynamic diagram) of a gathering condition of the personnel in all areas of the university, including, but not limited to life supporting facilities such as an office building, an apartment building, a teaching building, a dining room, a library, and a gymnasium.

2) Epidemic Control Source Tracing

The record and inquiry of behavior trajectories of the personnel in the overall university are achieved by real-time positioning service. Activity trajectories of the personnel are dynamically presented in combination with a campus map and positioning data, and thus, the activity trajectories of the personnel may be rapidly found. Meanwhile, based on the positioning data, a contact distance between every two of the personnel and a contact duration are analyzed to establish a close contact model, and thus, close contacts with different time ranges such as 14 days and 21 days may be rapidly inquired. In the present project, an audio signal positioning method is introduced to make up defects of an indoor positioning technology in this aspect, thereby providing the technical assurance for establishing a complete in-campus position service network for the university and guaranteeing the safety of the teachers and the students.

By trial popularization, it is proven that the audio signal positioning technology has the characteristics of accuracy, stability, reliability, compatibility, and durability when indoor positioning data is provided.

Application Example 3

A positioning and navigation system for a large railway station in a certain city: by a pseudo-satellite signal provided by an acoustic base station mounted in an area of the railway station, on a square outside the railway station and in an underground parking, indoor and outdoor integrated seamless navigation is provided for the public, and meanwhile, position service of production and security personnel is provided for a management platform.

A user uses a special navigation application APP integrated with an indoor engine, and a GNSS satellite signal is abutted when the personnel are located in an outdoor area; and after the personnel enter indoors, the APP automatically determines to enter an indoor environment, a positioning signal is switched from the GNSS satellite signal to an audio signal, and thus, positioning service is provided continuously. Positional information may be loaded to a management cloud service platform via a WiFi or 4G signal, and thus, functions such as device or personnel distribution perception, risk pre-warning, dynamic patrol exhibition, video monitoring linkage, and emergency direction management are provided for a manager.

Application Example 4

A positioning system for personnel/devices in a cargo airport in a certain city: a positioning result is shown for a user by adopting an acoustic positioning technology and using an analog-digital fused positioning algorithm and a high-precision map, and thus, indoor and outdoor integrated personnel/device positioning service is provided. Positioning of personnel, vehicles, and capital devices in the airport and main indoor areas such as relevant loading/unloading areas and workshops is achieved, and functions mainly include real-time positioning of personnel, vehicles, and capitals, electronic fence alarming, one-button alarming, trajectory replaying and the like, so that the safety management work is converted from labor management and process management into wisdom management, the safety management effect is greatly improved, and a high application value is achieved.

Application Example 5

An visitor guiding and positioning system for a 5G exhibition hall of a mobile company: the mobile company popularizes how 5G will change the life style of people and improve the life quality to the public and also holds an exhibition with the theme "5G+future" in a wing of the company to promote the latest application results of 5G technologies in various industries. By using an acoustic analog-digital fused positioning system, all devices in the exhibition hall may acquire positions themselves in real time and provide the positions to the visitors; and when the devices induce that the visitors appear near, introduction videos or voices are automatically played to achieve the purpose of linking "person looking for hall, and hall missing person".

Third, evidences for relevant results in embodiments: some positive benefits are achieved in research and development or use process in the embodiment of the present disclosure, compared with the prior art, the embodiment has great advantages in deed, and the following contents will be described in combination with data, charts and the like in an experimental process.

Figure 8:
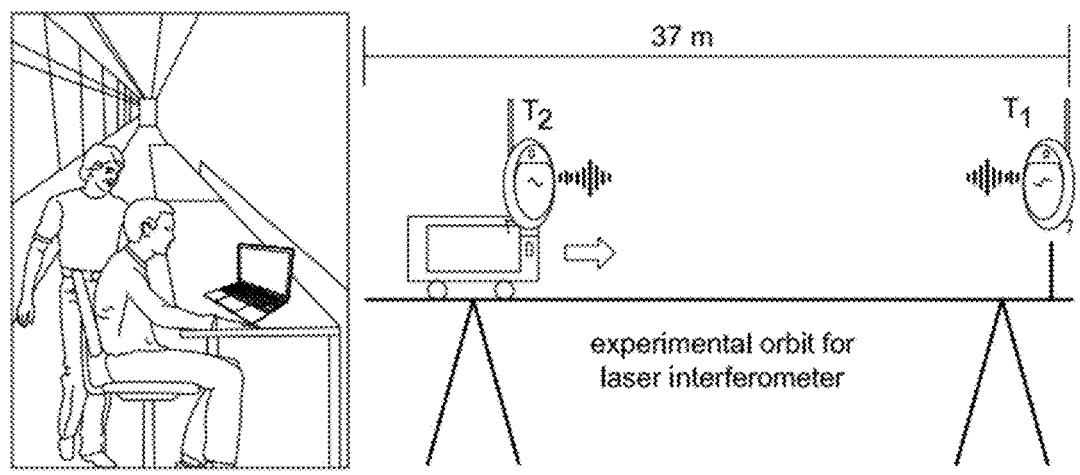
FIG. 8 is a schematic view of an experimental apparatus for evaluating the ranging difference performance on an orbit by using a laser interferometer provided in an embodiment of the present disclosure.

In order to evaluate the measurement precision of the TDoA of the APS, as shown in FIG. 8, an experiment is performed on a 37 m orbit in a laboratory. A signal transmitter $T_1$ is mounted on one end of the orbit, and another signal transmitter $T_2$ is mounted on a position very close to the microphone for testing the smartphone. By such a setting, it is only necessary to synchronize the clocks of the two transmitters, and the clock error $\Delta t_c$ of the smartphone and the transmitters may be eliminated according to a difference of the delay $\Delta t_i$ of $T_1$ and $T_2$ and is expressed as follows:

$$TDoA=(\Delta t_1+\Delta t_c)-(\Delta t_2+\Delta t_c)=\Delta t_1-\Delta t_2$$

$$\Delta d=c \cdot TDoA$$

In addition, a true value $\Delta d$ of a ranging difference is precisely measured by using a laser interferometer. Then, an error of $\Delta d$ may be calculated by comparing the measured value of the smartphone with the true value measured by the laser interferometer. Four experiments are performed along the orbit, and for each experiment, measurement is performed every other two meters along the orbit. Table 1 shows error statistics for the ranging difference.

TABLE 1

Error Statistics for Ranging Difference

| | Minimum value | Maximum value | Mean value | Mean square error |
|---|---|---|---|---|
| Error (m) | 0.02 | 0.44 | 0.16 | 0.20 |

After the ranging difference performance is evaluated, performance evaluation for a positioning solution is performed in the exhibition hall 1 of the certain international exhibition center, as shown in FIG. 9. For both of static and dynamic tests, four different types of smartphones: Huawei P9. Huawei P40, MIUI 10, and Honor 8 are used. The static test is performed on a true ground coordinate point obtained by a Leica TS60 total station, with the ranging precision being 0.6 mm+1 ppm and the angle error being 0.5 arc second. The dynamic test is performed at a walking velocity along a preset trajectory, an actual ground condition of a dynamic trajectory is also measured in real time by using the same total station, table 2 is error statistics for the static test, and table 3 is error statistics for the dynamic test. As shown in the table 2 and the table 3, the average 38 cm positioning precision may be achieved in a static state, and the average 58 cm positioning precision may be achieved in a dynamic state.

As shown in FIG. 9, a reference point is measured by using the Leica TS60 total station, with the ranging precision being 0.6 mm+1 ppm and the angle error being 0.5 arc second, as shown in FIG. 9(a). As shown in FIG. 9(b) and FIG. 9(c), static and dynamic (walking velocity) tests are performed.

TABLE 2

Static Positioning Error of APS

| Type of phone | Minimum value | Maximum value | Mean value | Mean square error |
|---|---|---|---|---|
| MIUI 10 | 0.06 | 0.76 | 0.38 | 0.42 |
| Honor 8 | 0.08 | 0.77 | 0.32 | 0.37 |
| Huawei P9 | 0.02 | 0.75 | 0.37 | 0.42 |
| Huawei P40 | 0.05 | 1.23 | 0.48 | 0.56 |
| Mean value | 0.05 | 0.88 | 0.38 | 0.44 |

TABLE 3

Error Statistics for Dynamic Test

| Type of phone | Minimum value | Maximum value | Mean value | Mean square error |
|---|---|---|---|---|
| MIUI 10 | 0.00 | 2.25 | 0.48 | 0.63 |
| Honor 8 | 0.00 | 2.48 | 0.46 | 0.61 |
| Huawei P9 | 0.00 | 1.96 | 0.84 | 0.55 |
| Huawei P40 | 0.00 | 3.31 | 0.53 | 0.70 |
| Mean value | 0.00 | 2.50 | 0.58 | 0.62 |

What is claimed is:

1. An acoustic positioning method for a smartphone and a wearable device, wherein the acoustic positioning method for the smartphone and the wearable device comprises:
   transmitting a ranging signal by virtue of a base station network, receiving and decoding the ranging signal by virtue of a user terminal, estimating distances from base stations to the user terminal according to first arrival signals, and estimating the position of a user according to a plurality of distances measured on the position of the user;
   wherein the acoustic positioning method for the smartphone and the wearable device comprises the following steps:
   step 1, designing Chirp signals of which the frequencies are 12 kHz to 21 kHz;
   step 2, performing precise ranging based on acoustic waves; and
   step 3, performing positioning based on acoustic ranging and an inertial sensor;
   wherein performing positioning based on acoustic ranging and an inertial sensor in the step 3 further comprises:
   by applying a sliding window program to the measurement of an IMU of which the step length is 10 Hz, obtaining the output rate, which is 20 Hz, of a learned velocity vector, wherein a displacement vector is estimated by multiplying a time interval of two continuous periods $t_1$ and $t_2$ by the velocity vector and is expressed as follows:

$$\begin{bmatrix} \Delta x \\ \Delta y \\ \Delta z \end{bmatrix} = \begin{bmatrix} v_x \\ v_y \\ v_z \end{bmatrix}(t_2 - t_1)$$

collecting measured values of a distance and an azimuth from absolute coordinates, and estimating the position of the user by using a 2D method;
   fusing the displacement vector obtained from a PDR network by adopting the extended Kalman filter, wherein the displacement vector is located in local coordinates L(x, y, u) defined by an initial heading x and a vertical direction u, and the y axis is defined under the action of right-handed Cartesian coordinates; as final coordinates output by the EKF are in navigation coordinates G(e, n, u) defined in an east, north, up direction, forming, by the two coordinates G and L, a rotation angle θ on a horizontal plane: introducing the rotation angle θ to a state vector of the filter as follows:

$$X_k = [e_k \quad n_k \quad \theta_k]^T$$

wherein $[e_k, n_k]$ are respectively horizontal coordinates in east and north directions within an epoch k: $\theta_k$ comprises a rotation angle between the coordinates G and L and an accumulated drift error of the gyroscope: a state transition equation of a system is described as follows:

$$\tilde{X}_k = f(X_{k-1}) + W_k = \begin{bmatrix} e_{k-1} + \Delta x_k \cos(\theta_{k-1}) + \Delta y_k \sin(\theta_{k-1}) \\ n_{k-1} - \Delta x_k \sin(\theta_{k-1}) + \Delta y_k \cos(\theta_{k-1}) \\ \theta_{k-1} \end{bmatrix} + W_k$$

wherein $\tilde{X}_k$ is a predicted state vector: $W_k$ is process noise subject to normal distribution $N(0, Q_k)$, and $Q_k$ is a covariance matrix of the process noise; and $\Delta x_k$ and $\Delta y_k$ are displacement components in the local coordinates L from a period k-1 to a period k obtained by a data-driven PDR network;

synchronizing clocks among all the signal transmitters by using a 433 MHz radio frequency, and achieving a synchronization error which is smaller than 0.1 ms; if the ranging signal is received from the plurality of signal transmitters, using a plurality of TDoA observation data, wherein an observation equation $Z_k$ is expressed as:

$$Z_k = h(X_k) + V_k, = \begin{bmatrix} (\|X_k - S_2\| - \|X_k - S_1\|)/c \\ \vdots \\ (\|X_k - S_i\| - \|X_k - S_{i-1}\|)/c \\ \vdots \\ (\|X_k - S_m\| - \|X_k - S_{m-1}\|)/c \end{bmatrix} + V_k, i = (2, \ldots, m)$$

$$\tilde{Z}_k = h(\tilde{X}_k) = \begin{bmatrix} (\|\tilde{X}_k - S_2\| - \|\tilde{X}_k - S_1\|)/c \\ \vdots \\ (\|\tilde{X}_k - S_i\| - \|\tilde{X}_k - S_{i-1}\|)/c \\ \vdots \\ (\|\tilde{X}_k - S_m\| - \|\tilde{X}_k - S_{m-1}\|)/c \end{bmatrix}, c = 331.45\sqrt{1 + \frac{T}{273.15}}$$

wherein h(*) is an observed transition matrix, $\tilde{Z}_k$ is a vector of a predicted observed value calculated by using the predicted state vector $\tilde{X}_k$, S is a coordinate vector of an $i^{th}$ transmitter in the coordinates G, $V_k$, is an error vector of $Z_k$, and $Z_k$ is subject to normal distribution $N(0, R_k)$ wherein $R_k$ is a covariance matrix of $Z_k$, m is the number of the transmitters available on the current position of the user, and c is a sound velocity at the temperature T;

updating the EKF as:

$$\tilde{P}_k = F_k P_{k-1} F_k^T + Q_k$$

$$K_k = \tilde{P}_k H_k^T (H_k \tilde{P}_k H_k^T + R_k)^{-1}$$

$$X_k = \tilde{X}_k + K_k(Z_k - \tilde{Z}_k)$$

$$P_k = (I - K_k H_k)\tilde{P}_k,$$

wherein $F_k = \partial h/\partial X_k$, $H_k = \partial h/\partial X_k$, $X_k$ is state estimation, $\tilde{P}_k$ is a predicated covariance matrix, $P_k$ is an updated covariance matrix, $K_k$ is a Kalman gain, and I is a unit vector.

2. The acoustic positioning method for the smartphone and the wearable device of claim 1, wherein the Chirp signals designed in the step 1 are expressed as:

$$s(t) = A(t)e^{j2\pi\left(f_0 t + \frac{f_e - f_0}{2T} t^2\right)}, t \in [0, T]$$

wherein A(t) is an amplitude of an acoustic wave, T is a period of each Chirp signal, and $f_0$ and $f_e$ are respectively an initial frequency and a cutoff frequency; and by analyzing an indoor fading channel, a received signal is expressed as:

$$x(t) = s(t) * h(t) = \sum_{i=0}^{L-1} \alpha_i s(t - \tau_i) + N_i(t)$$

wherein $\alpha_i$, $\tau_i$ and (t) are respectively a channel fading coefficient, propagation delay and random noise of an $i^{th}$ propagation path, h(t) is a channel impulse response in an indoor environment, $\tau_i$ is the delay of an $i^{th}$ component, and $\tau_0$ is the delay of a first line-of-sight component.

3. The acoustic positioning method for the smartphone and the wearable device of claim 1, wherein performing precise ranging based on acoustic waves in the step 2 comprises:

adopting a 50 ms Chirp period for the Chirp signals;
generating the given ranging signal s(t) in the smartphone, and performing Fourier transformation on a corresponding signal x(t) received by a microphone to obtain frequency domain descriptions of signals S(f) and X(f); and deducing a generalized cross spectrum G(f) as:

$$G(f) = E[S(f)X(f)^H]$$

wherein E[*] is a mathematical expectation operator, f is a signal frequency, and H is hermitian transformation; adopting a phase transformation and weighting solution to obtain unit gains of all frequency components, and retaining actual delay information;

$$\hat{G}(f) = G(f)/|G(f)|$$

performing inverse Fourier transformation to obtain the following relevant function $R(\tau)$:

wherein $\tau$ is the delay of the relevant function, and the delay $\Delta t$ of the ranging signal s(t) is obtained by the following formula:

$$\Delta t = \underset{\tau}{\mathrm{argmin}}\{|R(\tau)| \geq \beta \cdot \max[|R(\tau)|]\}$$

wherein $\beta$ is a threshold factor, and $\beta \cdot \max [|R(\tau)|]$ represents an estimated threshold;

after the delay $\Delta t$ is obtained, calculating a distance d from the user terminal to a corresponding base station sending the signal;

$$d = \Delta t \cdot c$$

wherein c is a sound velocity which is 343 m/s; and after a distance among at least three base stations, estimating the position of the user terminal by applying a least square trilateration algorithm or synthesis filtering algorithm.

4. The acoustic positioning method for the smartphone and the wearable device of claim 1, wherein performing positioning based on acoustic ranging and an inertial sensor in the step 3 comprises:

estimating the position of the user terminal by integrating an acoustic range and a measured value of the inertial sensor, wherein a data driving part and a model driving part are comprised in data processing for estimating the position of the user, the data driving part estimates a velocity vector of the user based on a deep learning method, and the model driving part integrates the velocity vector and ranging measurement to estimate the position, heading and velocity of the user by using an extended Kalman filter;

(1) the data driving part estimates the velocity vector $v=[v_x, v_y, v_z]^T$ according to measured values of an accelerometer and a gyroscope sensor on the smartphone or a label, which is a data driving method based on the deep learning method;

(2) the model driving part integrates the velocity vector and precise ranging based on acoustic waves to estimate the position, heading and velocity of the user by using the extended Kalman filter.

5. An information data processing terminal, wherein the information data processing terminal is for achieving the acoustic positioning system for the smartphone and the wearable device of claim 4.

6. An acoustic positioning system for a smartphone and a wearable device, to which the acoustic positioning method for the smartphone and the wearable device of claim 1 is applied, wherein the acoustic positioning system for the smartphone and the wearable device comprises a base station network for transmitting a ranging signal, specifically designed space signals, and a user terminal used for receiving and decoding the ranging signal and estimating the position of a user;

wherein the base station network is a group of signal transmitters with each consisting of a loudspeaker, a clock synchronization module, a Bluetooth low energy module, and a micro-controller unit, and is used for broadcasting the specifically designed signals in the air, and base station clocks in the network are synchronized with a 433 MHz radio frequency;

the space signals are a group of linear frequency modulation signals of which the frequencies are 12 kHz to 21 kHz;

the user terminal is used for receiving and decoding the ranging signal, estimating distances from base stations to the user terminal according to first arrival signals, and estimating the position of the user according to a plurality of distances measured on the position of the user; and the user terminal executes a synthetic signal processing program and is used for positioning a smartphone of a person or a label of an object or vehicle and developing a dedicated chip for a label-based user terminal.

\* \* \* \* \*